US007500426B2

(12) United States Patent
Zittel et al.

(10) Patent No.: US 7,500,426 B2
(45) Date of Patent: Mar. 10, 2009

(54) ROTARY COOKER AND COOLER WITH IMPROVED PRODUCT TRANSFER MECHANISM

(75) Inventors: David R. Zittel, Columbus, WI (US);
Daniel D. Maupin, Corvallis, OR (US);
Steven W. Hughes, Beaver Dam, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 659 days.

(21) Appl. No.: 11/090,243

(22) Filed: Mar. 25, 2005

(65) Prior Publication Data

US 2006/0213372 A1 Sep. 28, 2006

(51) Int. Cl.
*A23N 12/04* (2006.01)

(52) U.S. Cl. .............................. 99/348; 99/355; 99/361; 99/367; 99/370; 99/470; 99/443 C; 99/517; 134/65; 134/132

(58) Field of Classification Search ........................ None
See application file for complete search history.

(56) References Cited

U.S. PATENT DOCUMENTS

| 2,299,080 | A | * | 10/1942 | De Back | 426/509 |
|---|---|---|---|---|---|
| 2,314,871 | A | * | 3/1943 | De Back | 134/65 |
| 4,157,061 | A | * | 6/1979 | Margus, Jr. | 99/352 |
| 4,994,294 | A | * | 2/1991 | Gould | 99/348 |
| 5,133,249 | A | | 7/1992 | Zittel | |
| 5,329,842 | A | * | 7/1994 | Zittel | 99/348 |
| 5,429,041 | A | | 7/1995 | Zittel | |
| 5,632,195 | A | | 5/1997 | Zittel | |
| 5,752,431 | A | | 5/1998 | Zittel | |
| 5,972,413 | A | * | 10/1999 | Whitney et al. | 426/618 |
| 6,187,360 | B1 | | 2/2001 | Zittel et al. | |
| 6,205,913 | B1 | | 3/2001 | Zittel et al. | |
| 6,263,785 | B1 | | 7/2001 | Zittel | |
| 2006/0283333 | A1 | * | 12/2006 | Zittel et al. | 99/348 |

OTHER PUBLICATIONS

European Search Report for European Application No. 05253925.1-2313, mailed Jul. 31, 2006.
Examination Report dated Jun. 3, 2008, 7 pages.
Declaration of Daniel D. Maupin dated Aug. 13, 2008, 5 pages.

* cited by examiner

*Primary Examiner*—Joseph M Pelham
(74) *Attorney, Agent, or Firm*—Michael Best & Friedrich LLP

(57) ABSTRACT

A food processing apparatus includes a tank having an inlet end and a discharge end and at least one baffle divides the tank into a first compartment and a second compartment, wherein a temperature of the first compartment is greater than a temperature of the second compartment. A first drum is rotatably mounted within the first compartment of the tank such that a heat transfer medium contained in the first compartment of the tank will enter the first drum and a second drum is rotatably mounted within the second compartment of the tank such that a cool transfer medium contained in the second compartment of the tank will enter the second drum. A food product transfer device transfers food product from the first drum to the second drum. The food product transfer device defines a passageway having a first portion at least partially disposed in the first drum and a second portion at least partially disposed in the second drum, wherein the second portion is positioned to prevent the heat transfer medium from flowing from the first drum to the second drum through the food product transfer device.

21 Claims, 4 Drawing Sheets ized from the cooker portion to the cooler portion when
ROTARY COOKER AND COOLER WITH IMPROVED PRODUCT TRANSFER MECHANISM

BACKGROUND

The present invention relates to a combination cooker and cooler, and in particular a product transfer mechanism for transferring food product from the cooker to the cooler and for minimizing heat loss from the cooker to the cooler.

In mass processing of food product, food product is often heated by cooking or blanching the food product in a blanching food processing apparatus having a tank holding a heat transfer medium into which the food product is immersed. After cooking or blanching of the food product occurs, the food product is cooled or chilled by immersing the food product in a cooler transfer medium so that the food product may be packaged, stored and/or shipped. In one known system, a rotary drum blancher is used to first cook or blanch the food product. The food product is discharged onto a belt or other type of conveyor and advanced to a rotary drum cooler to reduce the food product temperature to an acceptable temperature.

In another known system, a single compact apparatus to heat and cool the food product in a continuous flow is used, that is a combination rotary cooker-cooler. A combination cooker-cooler generally includes a water tank divided into a heated compartment and a cooled compartment. Each compartment includes a drum rotatably mounted in the compartment. Food product is advanced through each drum by a helical auger and is transferred between the two drums. A combination cooker-cooler reduces the overall footprint of the food processing apparatus, however, such apparatus generally result in a loss of heat to the cooler portion when transferring food product from the cooker portion to the cooler portion. Conventional combination cooker-coolers use hot water, or a combination of hot water injected with steam, as the heat transfer medium. Previously, it was impractical to cook or blanch only using steam because steam leakage would be substantial, and therefore the process too expensive.

SUMMARY

In one embodiment, the invention provides a food processing apparatus including a tank having an inlet end and a discharge end, at least one baffle dividing the tank into a first compartment and a second compartment, a first manifold disposed within the first compartment for delivering a non-liquid heat transfer medium to the first compartment, and a second manifold disposed within the second compartment for delivering a cool transfer medium to the second compartment. A first drum is rotatably mounted within the first compartment of the tank, and has a helical auger therein for advancing food product from the inlet end of the tank toward the baffle through the non-liquid heat transfer medium. A second drum is rotatably mounted within the second compartment of the tank, and has a helical auger therein for advancing food product within the tank to the tank outlet through the cool transfer medium. The food processing apparatus also includes a product transfer mechanism for transferring food product from the first drum to the second drum.

In another embodiment the invention provides a food processing apparatus including a tank having an inlet end and a discharge end and at least one baffle dividing the tank into a first compartment and a second compartment, wherein a temperature of the first compartment is greater than a temperature of the second compartment. A first drum is rotatably mounted within the first compartment of the tank such that a heat transfer medium contained in the first compartment of the tank will enter the first drum. The first drum includes an inlet opening proximate the inlet end of the tank for receiving food product, a discharge opening proximate the at least one baffle, and a helical auger therein for advancing food product from the inlet opening towards the discharge opening. A second drum is rotatably mounted within the second compartment of the tank such that a cool transfer medium contained in the second compartment of the tank will enter the second drum. The second drum includes an inlet opening proximate the at least one baffle, a discharge opening proximate the discharge end of the tank where food product that has moved through the first and second drums is discharged, and a helical auger therein for advancing food product from the inlet opening of the second drum towards the discharge opening of the second drum. The food processing apparatus also includes a food product transfer device for transferring food product from the first drum to the second drum. The food product transfer device defines a passageway having a first portion at least partially disposed in the first drum and a second portion at least partially disposed in the second drum, wherein the second portion is positioned to prevent the heat transfer medium from flowing from the first drum to the second drum through the food product transfer device.

In yet another embodiment the invention provides a product transfer device for a food processing apparatus. The food processing apparatus includes a tank having an inlet end and a discharge end, at least one baffle dividing the tank into a first compartment and a second compartment, a first drum rotatably mounted within the first compartment of the tank and having means for advancing food product from the inlet end of the tank toward the baffle, and a second drum rotatably mounted within the second compartment of the tank and having means for advancing food product toward the tank outlet. The product transfer device includes a body fixed relative to the tank and defining a passageway for transferring food product from the first drum to the second drum, a first end further defining the passageway and at least partially disposed in the first drum for receiving food product from the first drum, the first end defining a flume, and a second end further defining the passageway and at least partially disposed in the second drum for depositing food product into the second drum, the second end extending substantially downward from the body and being below the first end.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
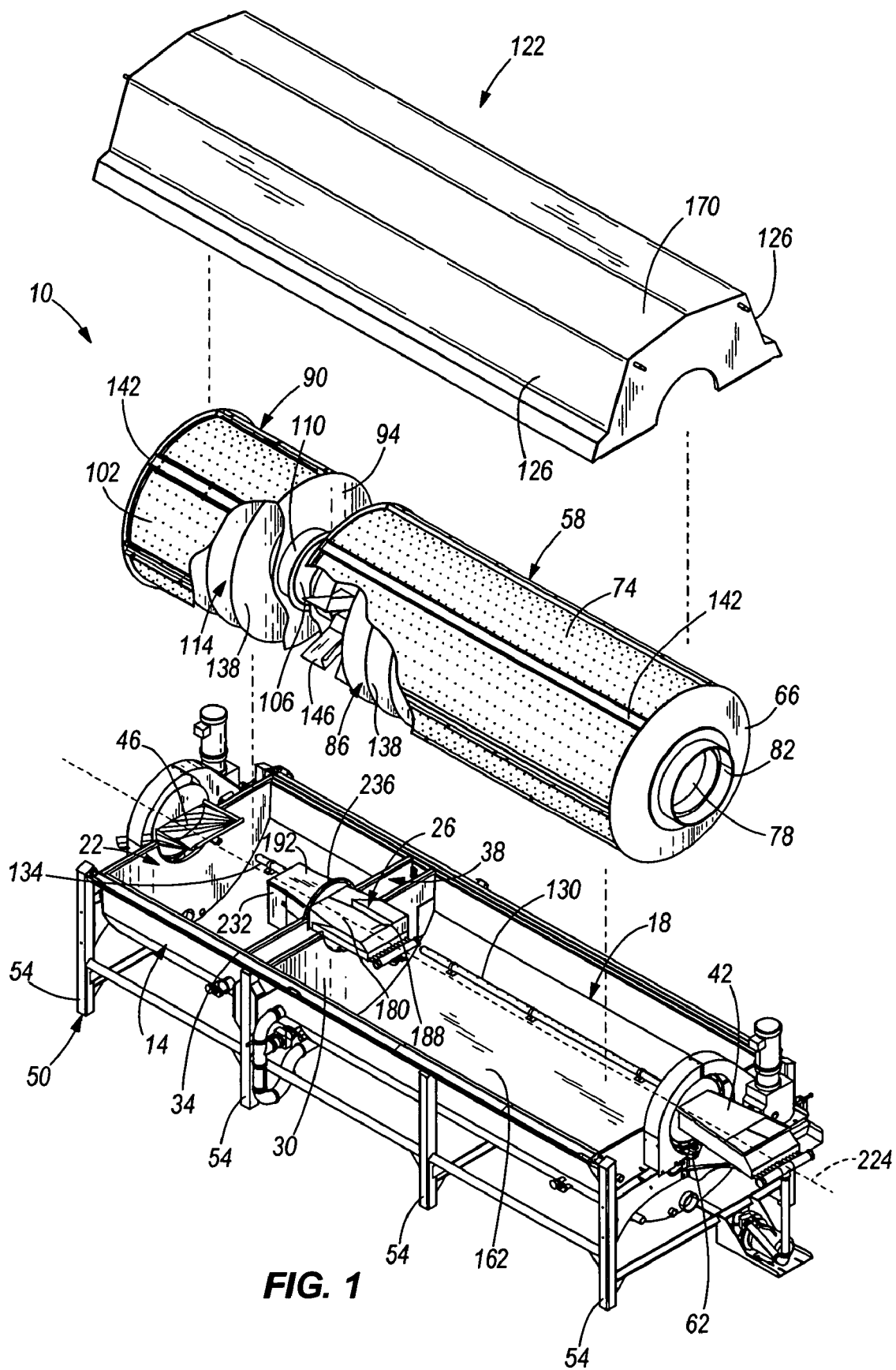
FIG. 1 is an exploded view of a food processing combination cooker and cooler including a product transfer device embodying the invention.
Figure 2:
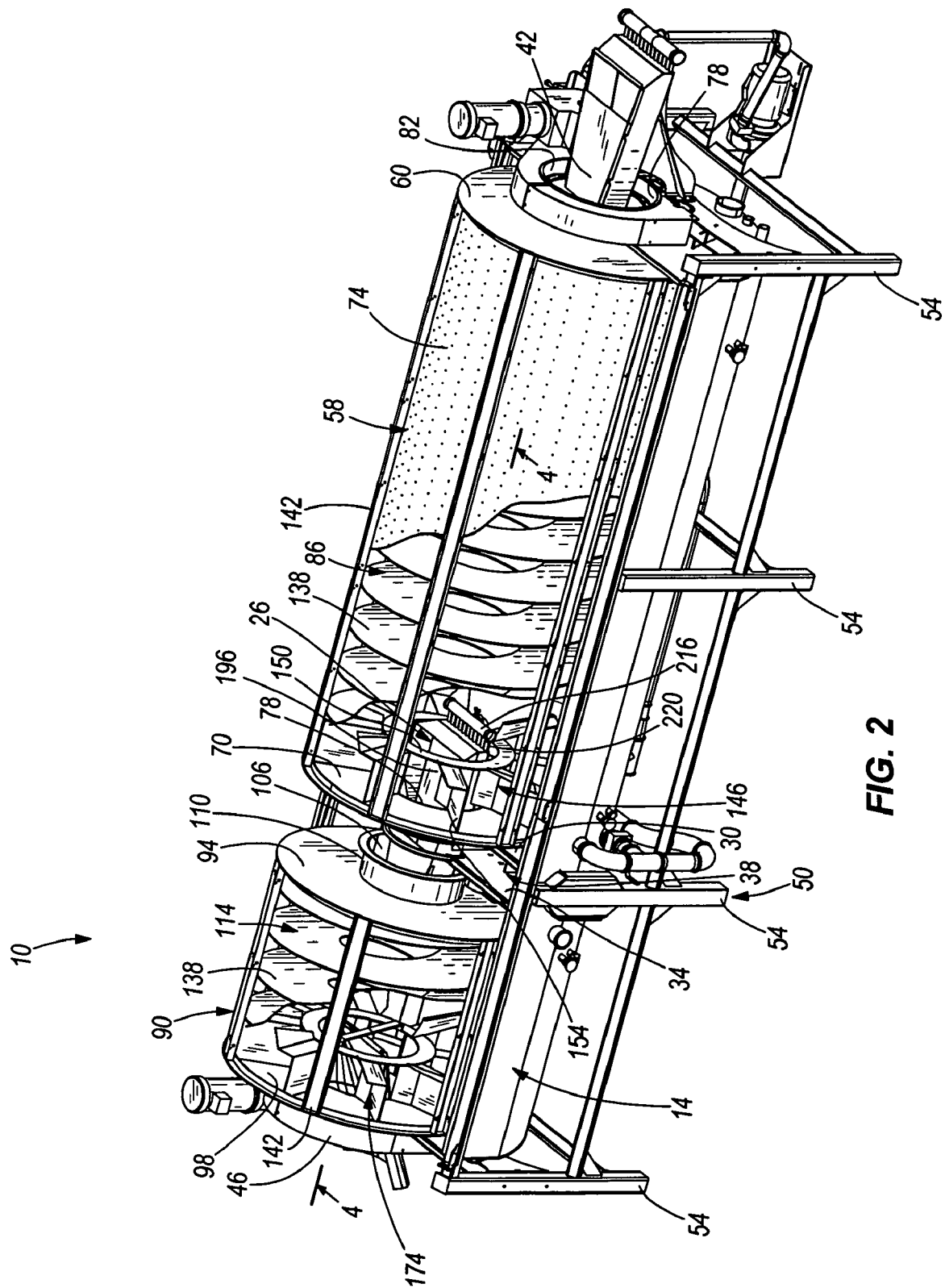
FIG. 2 is a perspective view of the cooker and cooler with a tank cover removed.
Figure 3:
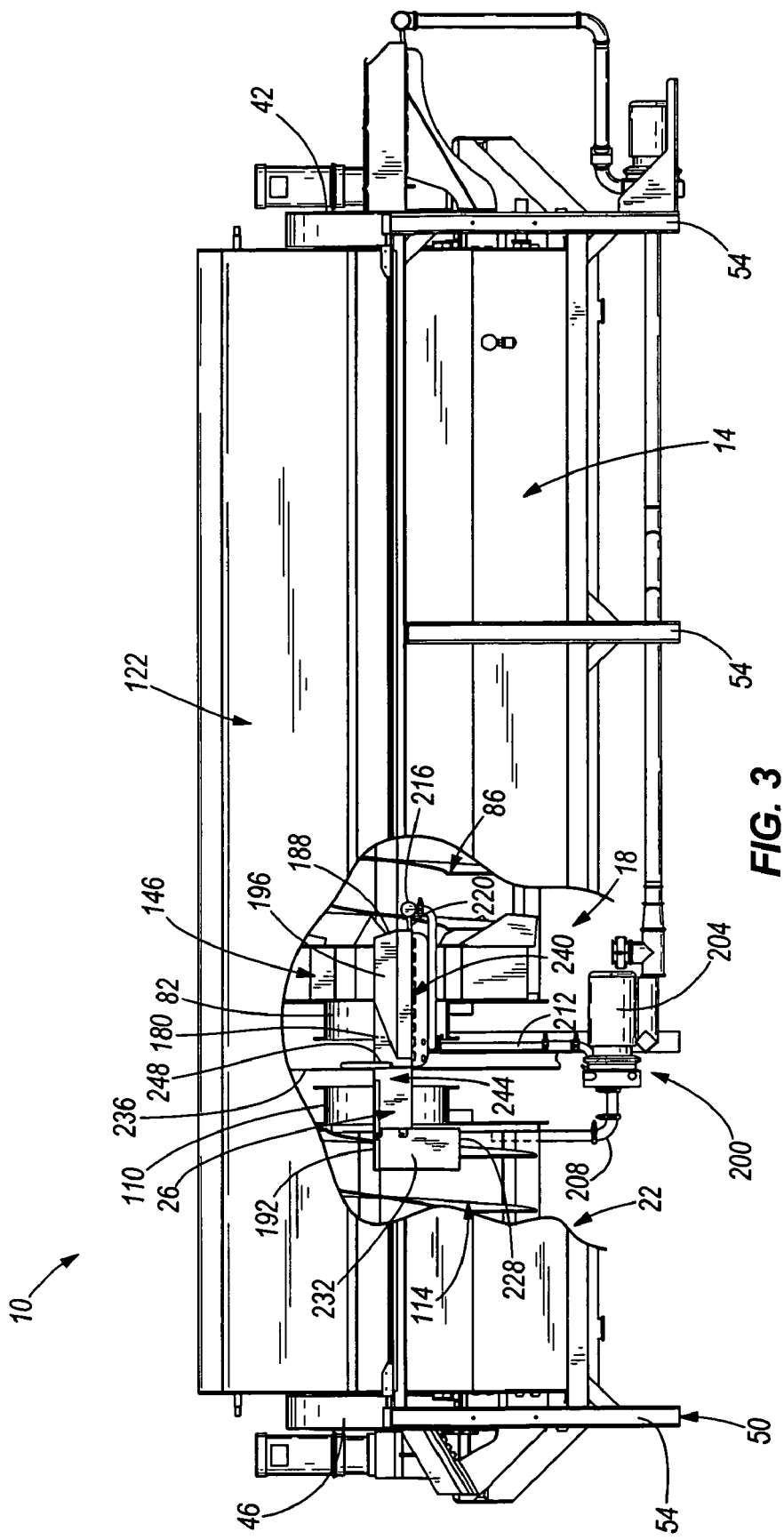
FIG. 3 is a side view of the cooker and cooler illustrating piping for the apparatus.

FIGS. 1-3 show a combination cooker-cooler 10 for use in a food processing system. The cooker-cooler 10 includes a tank 14 that is divided into a first heated compartment 18 for blanching or cooking a food product and a second cooled compartment 22 for cooling the food product. A product transfer device 26 transfers food product from the first compartment 18 to the second compartment 22 and prevents energy loss from the cooker-cooler 10, and in particular a heat loss from the first heated compartment 18 (i.e., the cooker) to the second cooled compartment 22 (i.e., the cooler).

A first baffle 30 and a second baffle 34 divide the tank 14 into the first compartment 18, an intermediate compartment 38, and the second compartment 22. The first compartment 18 is positioned between an inlet end 42 of the tank 14 and the first baffle 30, and the second compartment 22 is positioned between a discharge end 46 of the tank and the second baffle 34. The intermediate compartment 38 is defined between the first baffle 30 and second baffle 34 and houses a portion of the product transfer device 26. Further, the second baffle 34 and the intermediate compartment 38 provide a seal between the first and second compartments 18, 22. To help facilitate food product flow through the cooker-cooler 10, each baffle 30, 34 has a generally arcuately shaped opening and is of a sufficient height and constructed to prevent mixing of fluid or liquid between tank compartments during operation.

The tank 14 has an open top and is supported by a frame 50 that includes legs 54, which rest upon a support surface and space the tank above the support surface. A first drum 58, or cylinder, is rotatably mounted in the first compartment 18 and supported by at least one trunnion 62 at the inlet end 42 of the tank 14. The first drum 58 includes an inlet end plate 66 proximate the inlet end 42 of the tank 14 and a discharge end plate 70 proximate the first baffle 30 with a generally cylindrical and perforate sidewall 74 that substantially extends between the end plates 66, 70. Each end plate 66, 70 includes a food product opening 78, for receiving or discharging food product, generally defined by an axially outwardly extending flange 82. The outwardly extending flanges 82 generally define journals for supporting the drum 58 on trunnions. A helical auger 86 is disposed within the first drum 58 and rotates with the drum 58 for advancing food product from the inlet end 42 of the tank 14 toward the first baffle 30. To further support the auger 86, the first baffle 30, the first compartment 18 or the intermediate compartment 38 can also carry a trunnion (not shown).

Figure 4:
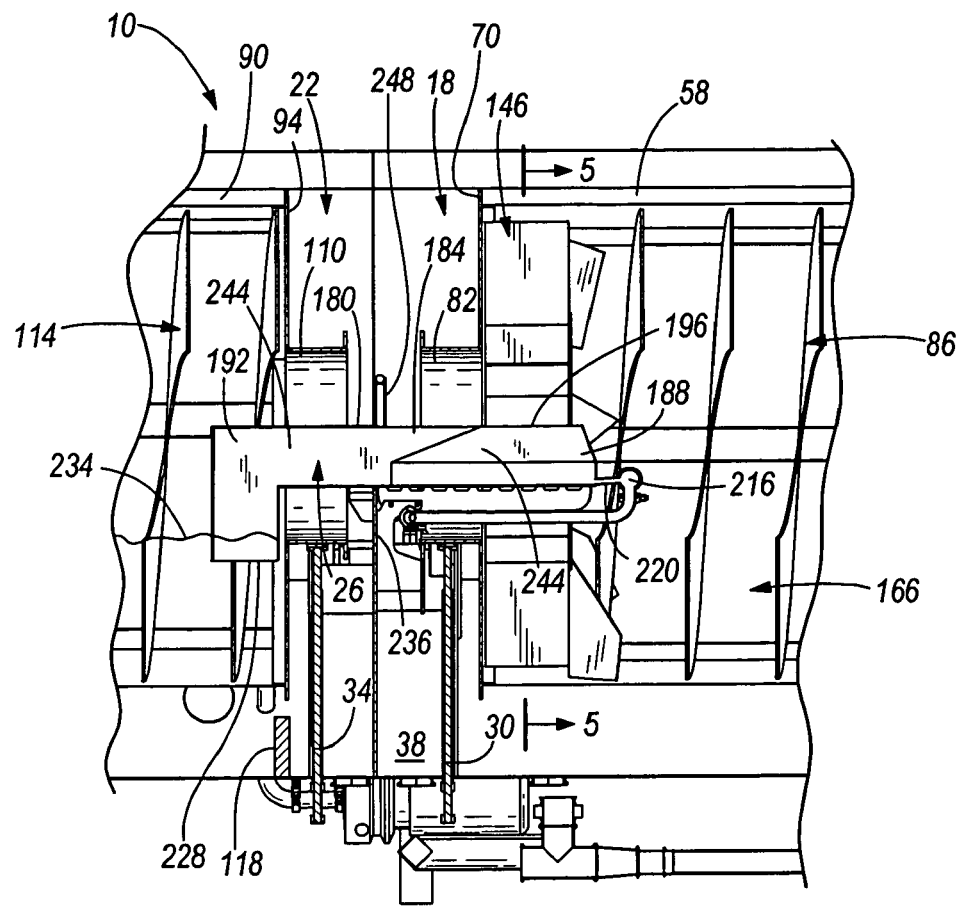
FIG. 4 is a sectional view of the cooker and cooler taken along a line 4-4 in FIG. 2.

A second drum 90, or cylinder, is rotatably mounted in the second compartment 22 the tank 14 and is supported by at least one trunnion (not shown) at the discharge end 46 of the tank 14. The second drum 90 includes an inlet end plate 94 proximate the second baffle 34 and a discharge end plate 98 proximate the discharge end 46 of the tank 14 with a generally cylindrical and perforate sidewall 102 that substantially extends between the end plates 94, 98. Each end plate 94, 98 includes a food product opening 106, for receiving or discharging food product, generally defined by an axially outwardly extending flange 110. The outwardly extending flanges 110 generally define journals for supporting the drum 90 on trunnions. A helical auger 114 is disposed within the second drum 90 and rotates with the drum 90 for advancing food product from the inlet end 94 of the second drum 90 toward the discharge end 46 of the tank 14. To further support the auger 114, the second baffle 34, the second compartment 22 or the intermediate compartment 38 can also carry a trunnion (not shown). Referring to FIG. 4, in one embodiment, a third baffle 118 is positioned in the second compartment 22 adjacent the second baffle 34. The second and third baffles 34, 118 define a box that in one embodiment carry a trunnion to support the second drum 90 and the auger 114.

In the illustrated embodiment, the first and second drums 58, 90 are driven independently of each other. The perforations in the sidewalls 74, 102 of the drums 58, 90 consist of a plurality of small diameter bores that extend completely through the sidewall to allow a heat transfer medium or a cool transfer medium to pass from the tank compartment, through the sidewall and into the drum.

An elongated vaulted cover 122 mates with the tank 14 and covers the tank 14 to substantially enclose the drums 90 and other components within the tank 14. In the illustrated embodiment, the cover 122 includes a pair of sidewalls 126, each with an opening (not shown) complementary with the drum journal for helping to facilitate rotation. In one embodiment, the cover 122 is hingedly connected to the tank 14 so the cover 122 can be swung away from the drums to permit access to the drums and the interior of the tank.

A heat transfer medium is supplied to the first compartment 18 of the tank 14 from a supply source (not shown) by one or more manifolds 130 (only one is shown for the purposes of illustration) disposed in the first compartment 18. The first drum 58 is constructed and arranged to receive the heat transfer medium such that the heat transfer medium can surround and contact the food product within the drum 58. In the first drum 58, the heat transfer medium blanches or cooks the food product as the food product is advanced through the drum 58 by the auger 86. In the illustrated embodiment, the heat transfer medium comprises a vaporous heat transfer medium, such as steam, a heated gas or another heated vapor. Each manifold 130 is a cylindrical pipe having one or more rows of spaced discharge ports or perforations disposed along its length through which a vaporous or gaseous heat transfer medium is introduced into the cooker portion 18 of the cooker-cooler, i.e., the first compartment. In another embodiment, a mixture of compressed air and vaporous heat transfer medium is discharged from the manifold 130 to better effect heat transfer. Other examples of the heat transfer medium include a combination of liquid and a gaseous or vaporous heat transfer medium, such as water and steam or water and water vapor, or a liquid heat transfer medium, such as water.

A cool transfer medium is supplied to the second compartment 22 of the tank 14 from a supply source (not shown) by one or more manifolds 134 (only one is shown for the purposes of illustration) disposed in the second compartment 22. The second drum 90 is constructed and arranged to receive the cool transfer medium such that the cool transfer medium can surround and contact the food product within the drum 90. In the second drum 90, the cool transfer medium cools the food product as the food product is advanced through the drum 90 by the auger 114. In the illustrated embodiment, the cool transfer medium comprises a liquid cool transfer medium, such as water. Each manifold 134 is a cylindrical pipe having one or more rows of spaced discharge ports or perforations disposed along its length through which a cool transfer medium is introduced into the cooler portion 22 of the cooker-cooler, i.e., the second compartment. In another embodiment, a mixture of compressed air and liquid cool transfer medium is discharged from the manifold 134 to better effect cooling. Other examples of the cool transfer medium include a combination of liquid and a gaseous cool transfer medium, such as water and air, or a gaseous cool transfer medium, such as air.

Each auger 86, 114 includes flights 138 such that as the auger rotates, the flights 138 move the food product being treated from an inlet opening to the discharge opening of the respective drum. In the illustrated embodiment, the augers 86, 114 are of coreless construction. Each drum 58, 90 includes circumferentially spaced apart elongate struts 142 that extend from the inlet end plate 66, 94 to the discharge end plate 70, 98 of the drum to help strengthen and rigidify the drum and the respective auger. Each strut 142 preferably has a generally C-shaped cross-section. Portions of the outer radial peripheral edge of at least some of the auger flights 138 are coupled to the support struts 142 of the respective drum, which provides support to the auger 86, 114 by the support struts 142 and the corresponding drum, as well as the end plates of the drum.

During operation, each drum and the respective auger are rotated to advance food product through the drum while causing food product to tumble within the drum. In the first drum 58, tumbling of the food product increases heat transfer from the heat transfer medium to the food product. Further, in the second drum 90, tumbling of the food product increases cooling of the food product by the cool transfer medium. In another embodiment, the augers 86, 114 and the drums 58, 90 are constructed such that the auger rotates relative to or independently of the respective drum to transport food product.

Figure 5:
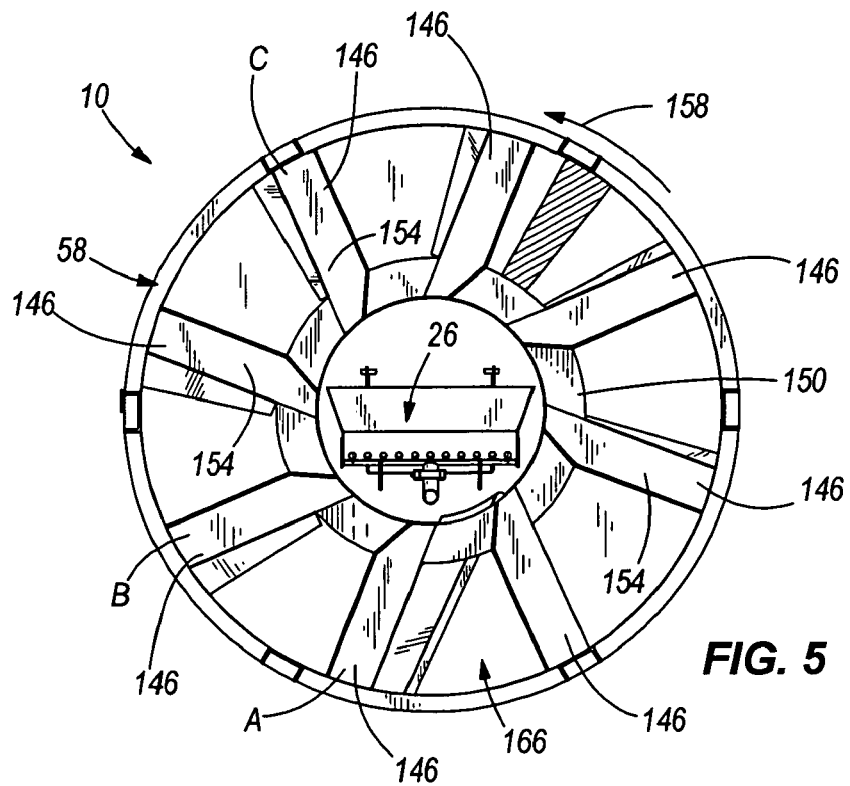
FIG. 5 is a sectional view of the cooker and cooler taken along a line 5-5 in FIG. 4.

When the food product reaches the discharge end plate 78 of the first drum 58 (i.e., the cooker), the food product is lifted and transferred to the product transfer device 26. As shown in FIGS. 2 and 5, a plurality of circumferentially spaced apart radial lifting flights 146 are used to transfer food product from the first drum 58 to the product transfer device 28. The lifting flights 146 extend radially inwardly from adjacent the first drum sidewall 74 toward the product transfer device 26 and to a central portion 150. In the illustrated embodiment, the lifting flights 146 include a plate 154 coupled to the sidewall 74 of the drum 58 and the lifting flights 146 rotate with the drum 58, for example in a direction shown by arrow 158 in FIG. 5. As the lifting flight 146 rotates toward a bottom 162 of the tank 14, the lifting flight 146 engages a discrete amount of food product at a bottom 166 of the drum 58 (e.g., at position A in FIG. 5) and lifts the food product as the lifting flight 146 continues to rotate (e.g., at position B in FIG. 5). As the lifting flight 146 rotates toward a top 170 of the tank, the food product is deposited in the product transfer device 26 (e.g., at position C in FIG. 5). In further embodiments, a single radial lifting flight is used to transfer the food product to the product transfer device 26, the lifting flight(s) rotate with the auger 86 relative to or independently of the drum 58, or the plate 154 of the lifting flight is perforate.

When the food product reaches the discharge end plate 98 of the second drum 90 (i.e., the cooler), the food product is lifted and transferred to the discharge end 46 of the tank 14 through which the food product is deposited on a conveyor, in a container, or the like. As shown in FIG. 2, a plurality of circumferentially spaced apart radial lifting flights 174 are used to transfer food product from the second drum 90 to the discharge end 46, which operate similar to the lifting flights 146 discussed above with respect to the first drum 58. In further embodiments, a single radial lifting flight is used to transfer food product to the discharge end 46 of the tank 14 or other suitable arrangements are used to transfer food product from the second drum 90 to the discharge end 46.

The product transfer device 26 is fixed relative to the tank and transfers food product from the first drum 58 to the second drum 90. Referring to FIG. 4, the product transfer device 26 includes a body 180 defining a passageway 184 for transferring food product, a first end 188 that further defines the passageway 184 and is partially disposed in the first drum 58, and a second end 192 that further defines the passageway 184 and is partially disposed in the second drum 90. The product transfer device 26 extends through the first and second baffles 30, 34 between the first and second drums 58, 90. The first end 188 has an open top and defines a flume 196 for receiving food product from the radial lifting flights 146 positioned at the discharge end 70 of the first drum 58.

The cool transfer medium or water facilitates transfer of food product through the product transfer device from the first end 188 to the second end 192, and in particular when the heat transfer medium is a non-liquid. Referring to FIG. 3, a piping system 200 transfers a portion of the cool transfer medium from the second drum 90 to the first end 188 of the product transfer device 26. A pump 204 pumps a portion of the cool transfer medium from the second drum 90 to a first conduit 208 and a second conduit 212. The first conduit 208 receives the cool transfer medium from the second drum 90 and the second conduit 212 delivers the cool product medium to the product transfer device 26. The product transfer device 26 includes a main conduit 216 positioned adjacent the first end 188 for receiving the cool product medium from the piping system 200 and a plurality of secondary conduits 220 (shown in FIGS. 2 and 3) for delivering the cool transfer medium from the main conduit 216 to the first end 188 of the product transfer device 26. The piping system 200 includes additional conduit and pumps for delivering the cool transfer medium to other parts of the cooker-cooler 10, such as the inlet end 42 of the tank 14.

In the illustrated embodiment, the product transfer device 26 is aligned generally parallel to a longitudinal axis 224 of the tank 14. In a further embodiment, the product transfer device 26 has a downward slope from the first end 188 to the second end 192 to facilitate transfer of food product through the product transfer device 26, and thereby require less cool transfer medium to transfer food product between the two drums 58, 90.

Food product is deposited into the second drum 90 through an opening 228 in the second end 192 of the product transfer device 26. In the illustrated embodiment, the second end 192 includes a box 232 coupled to the body 180 of the product transfer device 26 extending substantially downward from the passageway 184 and aligned generally perpendicular to the longitudinal axis 224 of the tank 14. In a further embodiment, the second end 192 includes an L-shaped passageway with a portion aligned generally perpendicular to the longitudinal axis 224 of the tank 14. The cool transfer medium, or water, covers the opening 228 in the second end 192 to form a water seal and prevent the heat transfer medium from flowing to the second drum 90. That is, food product is deposited below a water line 234 defined by the cool transfer medium. Preventing the heat transfer medium from flowing from the first drum 58 to the second drum 90 minimizes heat loss in the combination cooker-cooler 10.

In a further embodiment, the cool transfer medium is air or another gas. However, an amount of water is disposed in the second compartment 22 to form a seal with the opening 228 in the second end 192 of the product transfer device 26 to prevent the heat transfer medium from flowing to the second drum 90. Further, the water in the second compartment 92 is used to facilitate transfer of the food product in the product transfer device 26.

In the illustrated embodiment, a dividing plate 236 separates the product transfer device 26 between a first portion 240 adjacent the first end 188 and a second portion 244 adjacent the second end 192. The passageway 184 extends through the dividing plate 236. As shown in FIG. 1, the first portion 240 of the product transfer device 26 includes an open top, which allows food product to be deposited in the product transfer device 26, and the second portion 244 includes a closed top, which prevents the cool transfer medium from entering the product transfer device 26. The dividing plate 236 includes a gasket seal 248 to provide a seal between the open top, first portion 240 and the closed top, second portion 244. In another embodiment, the first portion 240 and the second portion 244 of the product transfer device 26 are formed of separate pieces. In still another embodiment, the first end 188 is substantially disposed in the first drum 58 and/or the second end 192 is substantially disposed in the second drum 90.

Generally, drums within a cooker-cooler are spaced apart about 9 inches. The product transfer device 26 embodying the invention permits the first drum 58 and the second drum 90 to be spaced apart a distance greater than 9 inches and still prevent heat loss from the first compartment 18 to the second compartment 22. In one embodiment, the first drum 58 and the second drum 90 are spaced apart about 18 inches. However, given space limitations within most food processing facilities, a greater distance between the first drum 58 and the second drum 90 would not typically be utilized.

In use, the combination cooker-cooler 10 is used to process fruits, vegetables and other food products. Food product can be processed in pouches or introduced directly into the cooker-cooler 10. Processing of food product using the cooker-cooler 10 described above includes first heating the food product and then cooling the food product after it has been heated.

In operation, food product is introduced into the combination cooker-cooler 10 through the opening 78 in the inlet end plate 66 of the first drum 58. In the first drum 58, food product is received by a heat transfer medium, that is preferably steam, inside the first compartment 18 and the first drum 58. The rotating auger 86 in the first drum 58 advances food product through the first drum 58 toward the second drum 90. The length of the drum 58, diameter of the drum 58, size of the first compartment 18, volume of heat transfer medium in the first compartment 18, depth of food product in the drum 58 and rotational speed of the auger 86 are all selected to impart the appropriate time for the food product within the first drum 58 to properly blanch or cook the food product before it is transferred to the second drum 90.

When the food product reaches the opening 78 in the discharge end plate 70 of the first drum 58, radial lifting flights 146 rotate with the first drum 58 and engage a portion of the food product at the bottom 166 of the first drum 58. The lifting flights 146 lift the food product from the bottom 166 of the first drum 58 and drop the food product into the product transfer device 26, which transfers food product to the second drum 90. The product transfer device 26 deposits food product below the water line 234 in the second drum 90 to prevent the steam in the first drum 58 from flowing to the second drum 90.

The product transfer device 26 introduces food product into the second drum 90 through the opening 106 in the inlet end plate 94. In the second drum 90, food product is received by the cool transfer medium, that is preferably water, inside the second compartment 22 and the second drum 90. A rotating auger 114 in the second drum 90 advances food product through the second drum 90 toward the discharge end 46 of the tank 14. The length of the drum 90, diameter of the drum 90, size of the second compartment 22, volume of cool transfer medium in the second compartment 22, depth of food product in the drum 90 and rotational speed of the auger 114 are all selected to impart the appropriate time for the food product within the second drum 90 to properly cool the food product before it is discharged from the second drum 90.

When the food product reaches the opening 106 in the discharge end plate 98 of the second drum 90, the radial lifting flights 174 rotate with the second drum 90 and engage a portion of the food product at a bottom of the second drum 90. The lifting flights 174 lift the food product from the bottom of the second drum 90 and deposit the food product to the discharge end 46 of the tank 14 and onto a conveyor or the like (not shown).

In a further embodiment, the food processing apparatus includes a blancher with multiple heating compartments or a blancher with a heating compartment and multiple cooling compartments.

Various features and advantages of the invention are set forth in the following claims.

What is claimed is:

1. A food processing apparatus comprising:
   a tank having an inlet end and a discharge end;
   at least one baffle divides the tank into a first compartment and a second compartment;
   a first manifold disposed within the first compartment for delivering a non-liquid heat transfer medium to the first compartment;
   a second manifold disposed within the second compartment for delivering a cool transfer medium to the second compartment;
   a first drum rotatably mounted within the first compartment of the tank, and having a helical auger therein, wherein the auger advances food product from the inlet end of the tank toward the baffle through the non-liquid heat transfer medium;
   a second drum rotatably mounted within the second compartment of the tank, and having a helical auger therein, wherein the auger advances food product within the tank to the tank outlet through the cool transfer medium; and
   a product transfer mechanism for transferring food product from the first drum to the second drum, wherein the product transfer mechanism includes a first end at least partially disposed in the first drum for receiving food product, a second end at least partially disposed in the second drum for depositing food product in the second drum, and a passageway defined therebetween, and further wherein the cool transfer medium is a volume of water that fills a portion of the second drum, wherein the second end of the product transfer mechanism deposits food product below a water line defined by the water.

2. The food processing apparatus of claim 1 wherein the non-liquid heat transfer medium comprises steam.

3. The food processing apparatus of claim 1 wherein the water covers the second end of the product transfer mechanism to prevent the non-liquid heat transfer medium from flowing to the second compartment.

4. The food processing apparatus of claim 1 wherein a portion of the water is conveyed from the second drum to the first end of the product transfer mechanism to facilitate transfer of food product from the first drum to the second drum.

5. The food processing apparatus of claim 1 wherein the passageway is substantially parallel to a longitudinal axis of the tank and the second end of the product transfer mechanism extends substantially perpendicular to the passageway.

6. The food processing apparatus of claim 1 wherein the product transfer mechanism is fixed relative to the tank.

7. The food processing apparatus of claim 1 wherein the at least one baffle comprises a first baffle and a second baffle spaced apart, the product transfer mechanism extending through both baffles.

8. A food processing apparatus comprising:
a tank having an inlet end and a discharge end;
at least one baffle divides the tank into a first compartment and a second compartment, wherein a temperature of the first compartment is greater than a temperature of the second compartment;
a first drum rotatably mounted within the first compartment of the tank such that a heat transfer medium contained in the first compartment of the tank will enter the first drum, the first drum including an inlet opening proximate the inlet end of the tank for receiving food product, a discharge opening proximate the at least one baffle, and a helical auger therein for advancing food product from the inlet opening towards the discharge opening;
a second drum rotatably mounted within the second compartment of the tank such that a cool transfer medium contained in the second compartment of the tank will enter the second drum and the cool transfer medium being a volume of water that fills a portion of the second drum including an inlet opening proximate the at least one baffle, a discharge opening proximate the discharge end of the tank where food product that has moved through the first and second drums is discharged, and a helical auger therein for advancing food product from the inlet opening of the second drum towards the discharge opening of the second drum; and
a food product transfer device for transferring food product from the first drum to the second drum, the food product transfer device defining a passageway having a first portion at least partially disposed in the first drum and a second portion at least partially disposed in the second drum, wherein the second portion of the food product transfer device deposits food products below the water line defined by the water, and is positioned to prevent the heat transfer medium from flowing from the first drum and out of the second portion and into the second drum through the food product transfer device.

9. The food processing apparatus of claim 8 wherein the first portion defines a flume for receiving food product.

10. The food processing apparatus of claim 8, and further comprising a dividing plate between the first portion and the second portion of the food product transfer device, wherein the passageway extends through the dividing plate, the dividing plate having a seal positioned between the first portion and the second portion of the food product transfer device.

11. The food processing apparatus of claim 8 wherein the first portion of the passageway is substantially parallel to a longitudinal axis of the tank and the second portion includes a free end for depositing food product in the second drum, the free end extending substantially perpendicular to the passageway.

12. The food processing apparatus of claim 8, and further comprising a box attached to the second portion of the food product transfer device, the box further defining the passageway and extending substantially downward from the second portion to deposit food product into the second drum.

13. The food processing apparatus of claim 8 wherein the water covers the second portion of the food product transfer device to prevent the heat transfer medium from flowing to the second drum.

14. The food processing apparatus of claim 8, and further comprising a conduit to convey a portion of the water in the second compartment to the first portion of the food product transfer device to facilitate transfer of food product through the passageway.

15. The food processing apparatus of claim 8 wherein the at least one baffle comprises a first baffle and a second baffle spaced apart, the food product transfer device extending through both baffles.

16. A product transfer device for a food processing apparatus, the food processing apparatus including a tank having an inlet end and a discharge end, at least one baffle dividing the tank into a first compartment and a second compartment, a first drum rotatably mounted within the first compartment of the tank and having means for advancing food product from the inlet end of the tank toward the baffle, and a second drum rotatably mounted within the second compartment of the tank and having means for advancing food product toward the tank outlet, the product transfer device comprising:
a body fixed relative to the tank and defining a passageway for transferring food product from the first drum to the second drum;
a first end further defining the passageway and at least partially disposed in the first drum for receiving food product from the first drum, the first end defining a flume; and
a second end further defining the passageway and at least partially disposed in the second drum for depositing food product into the second drum, the second end extending substantially downward from the body and being below the first end,
wherein a volume of water fills a portion of the second drum and the second end of the food product transfer device deposits food product below a water line defined by the water.

17. The product transfer device of claim 16, and further comprising a dividing plate to separate the body into a first portion adjacent the first end and a second portion adjacent the second end, the passageway extending through the dividing plate and the dividing plate including a seal between the first portion and the second portion, wherein the first portion includes an open top and the second portion includes a closed top.

18. The product transfer device of claim 16 wherein the passageway is substantially parallel to the longitudinal axis of the tank and the second end extends substantially perpendicular to the passageway.

19. The product transfer device of claim 16 wherein the second end comprises a box coupled to the body, the box extending substantially downward from the body to deposit food product into the second drum.

20. The product transfer device of claim 16 wherein the water covers the second end to prevent the heat transfer medium from flowing from the first drum to the second drum.

21. The product transfer device of claim 16, and further comprising a conduit interconnecting the second compartment and the first end for conveying a portion of the water to the first end, the water to facilitate transfer food product through the passageway.

* * * * *

UNITED STATES PATENT AND TRADEMARK OFFICE
CERTIFICATE OF CORRECTION

PATENT NO. : 7,500,426 B2  Page 1 of 1
APPLICATION NO. : 11/090243
DATED : March 10, 2009
INVENTOR(S) : Zittel et al.

It is certified that error appears in the above-identified patent and that said Letters Patent is hereby corrected as shown below:

Column 9, line 32, after the word "drum"
insert a comma and the phrase --, the second drum.--

Signed and Sealed this

Ninth Day of June, 2009

JOHN DOLL
*Acting Director of the United States Patent and Trademark Office*